E. R. WOLCOTT.
TREATMENT OF GASES.
APPLICATION FILED AUG. 14, 1909.
1,116,661.
Patented Nov. 10, 1914.
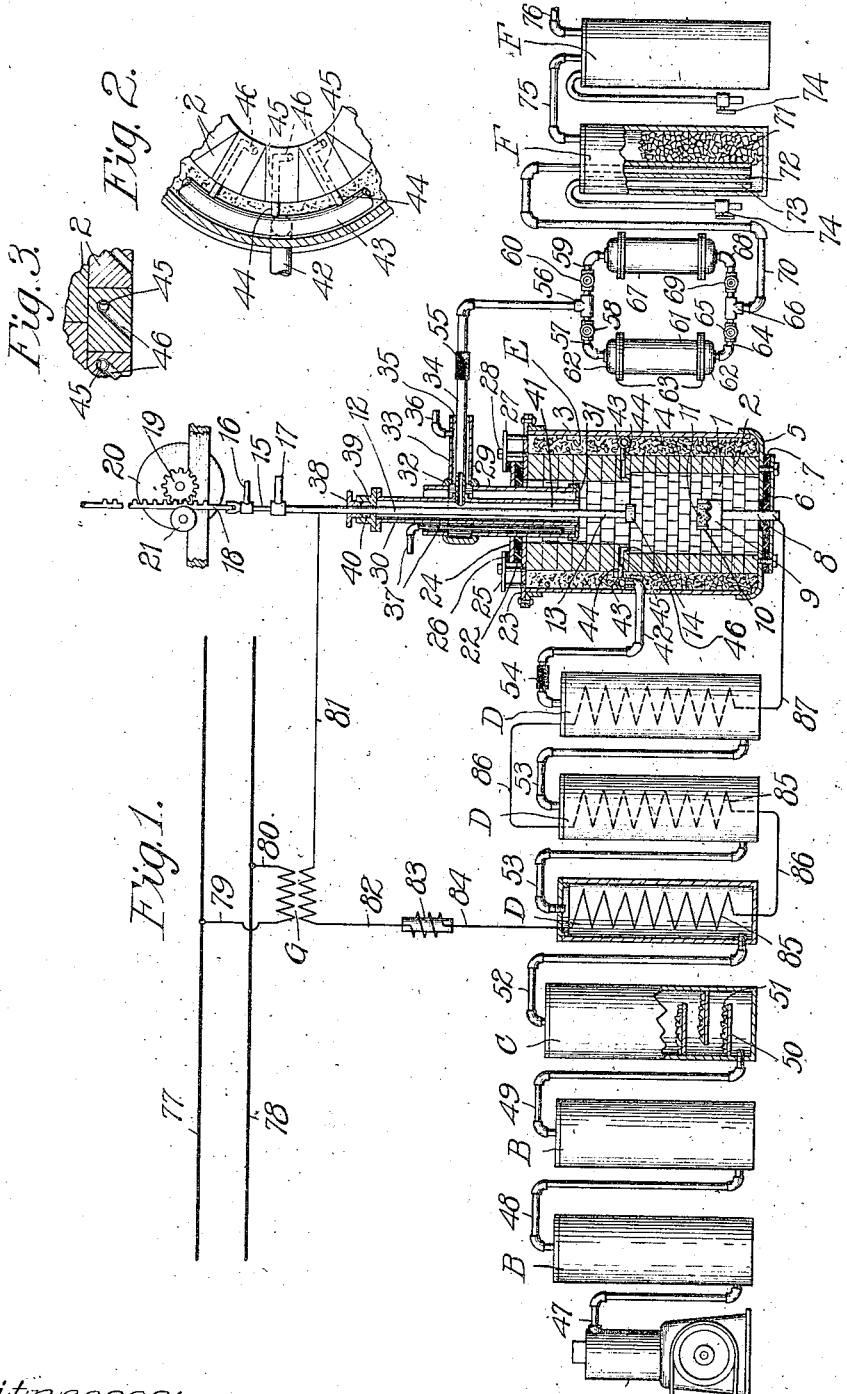
Witnesses:
Leonard W. Novander
George E. Higham
Inventor
Edson R. Wolcott
By Macen & Williams
Attorneys

UNITED STATES PATENT OFFICE.

EDSON R. WOLCOTT, OF CHICAGO, ILLINOIS.

TREATMENT OF GASES.

1,116,661.  Specification of Letters Patent.  Patented Nov. 10, 1914.

Application filed August 14, 1909. Serial No. 512,798.

*To all whom it may concern:*

Be it known that I, EDSON R. WOLCOTT, a citizen of the United States, residing at Chicago, in the county of Cook and State of Illinois, have invented certain new and useful Improvements in the Treatment of Gases, of which the following is a full, clear, concise, and exact description, reference being had to the accompanying drawings, forming a part of this specification.

My invention relates to apparatus for the treatment of gases, and has particular reference to apparatus used for combining the nitrogen and oxygen of air in order to form nitric acid or nitrates of suitable bases.

The general system which I employ has many points of similarity with that described in the co-pending application of Harry D. Rankin, Serial No. 506,044, filed July 6, 1909. There are several important features of difference, however, between my apparatus and that employed by Rankin. Among the more important may be mentioned the method of preheating the gases, which I employ. Instead of utilizing the heat of the furnace for this purpose by passing the gases through a coil surrounding the furnace I use a series of tanks which are heated electrically by means of including resistances in these tanks in the same electric circuit which serves to supply the heat to the main furnace.

In order to obtain a uniform action of the arc within the heating furnace I have found that it is of the greatest advantage to include a suitable inductance in series with the electric circuit supplying said arc. Not only does the arc operate better under such conditions, but there is also considerable saving in energy. Actual experience has demonstrated that by the use of an inductance at least 90% of the energy can be utilized in the arc. This, of course, does not make allowances for losses by radiation and other similar causes. For the same purpose various forms of constant current devices can be used which have suitable inductances, the result being that the fluctuations of the arc are thereby reduced to a minimum.

I have found that very superior results are obtained by so introducing the air into the combining chamber of the electric furnace that it is given a whirling motion in a downward direction toward the lower of the two electrodes within the combining chamber. The air, after passing downward in a whirling, rotary manner, then passes upward within the zone of downwardly whirling air. By this means the arc is given great steadiness of operation, and a much greater quantity of air can be passed through the furnace without disturbing the arc than is the case when the air is directly introduced from the lower part of the combining chamber and passes upwardly with or without whirling motion.

Another advantage of my system consists in the special form of apparatus which is used for removing the impurities from the combined gases coming from the furnace. This apparatus consists in a species of filter, comprising a cylinder which is packed with cotton waste or some other suitable straining material. The effect of this waste is not only to remove the impurities from the gases but also to effect a more perfect combination of the gases, thereby increasing the efficiency of the system as a whole. I have found that in some cases where the pressure of the gases is high and a large quantity of these gases passes through the dust remover that there is sometimes a tendency for the waste to become closely packed in one end of the cylinder, with the result that the free passage of gases is thereby prevented. In order to obviate this difficulty I employ a series of wooden frames within the cylinder, these frames having ordinary common cloth stretched over them. In this way a filtering apparatus is provided, consisting of many layers of cloth which cannot be packed together by any undue pressure exerted by the gases.

These and other advantages of my invention will be more apparent by reference to the accompanying drawings in which—

Figure 1 is a general view of my improved system showing parts of the apparatus in side elevation and parts in vertical section. Fig. 2 is a fragmentary, enlarged transverse section of the furnace wall showing the air inlets. Fig. 3 is a fragmentary vertical section of the bricks of the inner furnace wall showing the course of the air inlets.

In order to more readily understand the operation of my system as a whole I will first describe the detailed construction of the combining furnace, as shown in Figs. 1, 2 and 3. A combining chamber 1 is surrounded by a wall 2 of refractory brick. For this purpose I prefer to use magnesite, bauxite, chrome, or some other form of brick which has extremely refractory properties on account of the high temperatures which are attained within the furnace. Between the inner wall 2 and the iron or steel shell 3 is a layer of broken pieces of refractory material 4. Riveted to the shell 2 is the bottom plate 5, which serves to support the walls of the furnace. Bolted or riveted to the plate 5 is the second plate 6, separated from the plate 5 by a layer of refractory and insulating material 7. Securely mounted in the plate 6 and passing through the layer of insulating material 7 is the rod 8 of electrically conducting material. On the upper end of the rod 8 is mounted the electrode 9, which consists of a cup of refractory material 10 containing a composition 11, which is adapted to become molten when the furnace is in operation. The rod 8 projects through the bottom of the cup 9 so that an electrical contact is formed with the composition 11 within the cup. The lower end of the rod 8 is suitably connected with a source of electric current.

The upper electrode 12 is constructed of iron, steel, or other electrically conducting material, and is water cooled. The pipe 13 forming the outer portion of the electrode is provided on its lower end with a rounded head or extension 14, the inside of which is continuous with the inside of the pipe 13. Within the pipe 13 is provided a smaller pipe 15. It is clear that water may be introduced into the pipe 15 through the inlet 16, and that after passing through the head or extension 14 this water will flow upwardly between the outside of the pipe 15 and the inside of the pipe 13, and will then be carried away through the outlet 17. An electrical connection may be made on any point of the pipe 13 with the opposite terminal of a source of electric current to that with which the lower electrode is connected through the rod 8. Attached to the upper part of the pipe 15 is a rack 18, movable in a vertical plane by means of a pinion 19 rigidly connected with the disk 20, on which is mounted a handle, not shown in the drawing. A rotary guide 21 serves to hold the rack 18 in engagement with the pinion 19. Inasmuch as the pipes 15 and 13 are rigidly connected, it is evident that the electrode 12 may be moved as a whole in a vertical plane.

The top of the combining chamber 1 is provided with a gasket 22 of insulating material which rests on the top plate 23 bolted to the shell 3, this gasket in turn supporting a circular plate 24 provided with a circular opening, the purpose of which will be described hereafter. The plate 24 is securely held in position by means of clamps 25 which engage pieces of insulating material 26—as, for example, mica. The horizontal member 27 of the clamp 25 may be adjusted by turning a nut 28. It is clear that by this construction the plate 22 is electrically insulated from the shell 3 and top plate 23 of the furnace.

Passing through the opening in the plate 23 is the cooling apparatus for the gases passing out of the furnace. This cooling mechanism consists of an outer shell 29 and an inner shell 30, the lower portions of these two shells being sealed by means of angle irons 31. The space between the upper portions of these two shells is allowed to remain open. A coupling 32 is inserted in the outer shell 29 in a position above the furnace proper. Laterally extending from this coupling is the pipe 33, through which passes a smaller pipe 34 connecting with the inside of the inner shell 30. The space between the outer end of the pipe 33 and the pipe 34 is sealed by the portion 35. An outlet pipe 36 communicates through the pipe 33 with the space between the outer shell 29, and the inner shell 30. A pipe 37 is introduced in the space between the outer shell 29 and the inner shell 30, and passes downwardly to a position near the lower edges of these shells. It is now clear that if water is introduced through the pipe 37 it will fill the space between the shells 29 and 30 and also the space between the pipes 33 and 34, then passing away through the outlet pipe 36. The upper electrode 12 is adapted to move within a bearing which is composed of a collar 38 fitting within a second collar 39. Between these two collars is placed packing 40, so that it is impossible for gases to escape from the furnace between the pipe 13 and the collars 38 and 39. The inner shell 30 is securely attached to the lower collar 39. It is clear from the construction which I have described that there is a space, 41, between the inner shell 30 and the outer pipe 13 of the electrode 12, this space connecting directly with the interior of the combining chamber 1. It is evident that if gases under pressure are contained in the chamber 1 they will pass outwardly through the space 41 and the pipe 34. During such passage the outgoing gases are subjected to the cooling action of the water flowing between the outer shell 29 and the inner shell 30 and between the outside of the pipe 34 and the inside of the pipe 33. The gases are thus immediately cooled after leaving the combining chamber 1.

One of the special features of my invention consists of the method of introducing the air into the chamber 1. The pipe 42 conducting the preheated gases to the furnace passes through the shell 3 and connects with a pipe 43 which encircles the furnace within the portion 4 of the furnace wall. Connecting with the pipe 43 at frequent intervals are small pipes 44, shown in Figs. 1 and 2. These pipes, which are preferably of iron or steel, project into the fire brick which form the inner wall 2 of the furnace. Connecting with these pipes are passages 45 within the body of the brick, each passage directed radially inward in a horizontal plane toward the center of the furnace. Connecting with the passages 45 are the oblique downward passages 46, most clearly shown in Fig. 3. The inner wall 2 of the furnace is so constructed that the bricks having the passages 45 and 46 project inwardly over the portion of the wall below these bricks. From this description it is evident that as air is introduced through the pipe 42 it passes into the pipe 43, and thence through the pipes 44 and the passages 45 and 46 into the furnace. On account of the oblique direction of the passages 46 the air which comes in simultaneously on all sides of the combining chamber passes downwardly with a whirling motion, thereby protecting to a very considerable degree the inner wall 2 from the excessive heat generated in the furnace. After passing downwardly the air then passes upwardly, still retaining its whirling, rotary movement, inside of the cone which is formed by the downwardly passing air. It is on this upward movement that the air is subjected directly to the action of the electric arc, and that the combining action takes place. The inlets for the air are preferably located at about the level in which the lower part of the upper electrode normally operates.

Having described the detailed construction of my furnace, I will now deal with the operation of my system as a whole, as shown in Fig. 1.

A is an air-compressor which connects by means of the pipe 47 with the mechanical drier B. As the compressed air enters the drier B it immediately expands, with the result that the moisture is precipitated from the air, this moisture being periodically drawn off through a suitable stop-cock, which is not shown in the drawing. If desired, a second drier B may be connected with the first by means of pipe 48, and additional mechanical driers, or any desired number may be used. From the last mechanical drier the air passes through the pipe 49 to the bottom of the chemical drier C, the interior of which is provided with a series of shelves 50, on which is placed lime 51 or other desiccating material. The air next passes from the upper part of the drier C through the pipe 52 into a preheating chamber D, the operation of which will be described hereafter. Pipes 53 serve to connect any desired number of these heating chambers D. Leading from the last heating chamber is the pipe 42, in which is inserted an insulating section 54.

The preheated air passing through the pipe 42 enters the combining chamber 1 of the furnace E, as previously described, and after being subjected to the action of the arc the combined gases pass outwardly through the pipe 34. The size of the pipes for conducting the combined gases is a matter of importance, as the gases are decomposed if the pipe is too small. This may be owing to the generation by the friction of the gases within the pipe of static charges of electricity which then appear. When the gases are passing at the rate of 1 cubic foot per second, a pipe at least three inches in diameter should be used. The following reactions take place within the combining chamber:

(1) $N_2 + O_2 = 2NO$
(2) $2NO + O_2 = 2NO_2$.

Besides the oxids formed by the above reactions other lower oxids, as $N_2O$, $N_2O_3$, etc., may also be formed. The exact nature of these subsidiary reactions is more or less uncertain. An insulating section 55 is inserted in the outlet pipe 34, the object of the insulating sections 54 and 55 being to prevent any possible danger of a short circuit through the inlet or outlet pipes. I have found that it is a matter of great importance to have a perfect insulation at these points as any leakage of current increases the unsteadiness of the arc, whereas with a good insulation the arc may be operated steadily many hours with no change. Attached to the end of the pipe 34 is a T-coupling 56, to one side of which is attached the pipe 57, having the valve 58, and to the other side of which is attached the pipe 59, having the valve 60. Connected to the pipe 57 is a cylinder 61, having detachable ends 62 62, these ends being normally secured to the cylinder 61 by flanges 63. Attached to the lower end 62 of the cylinder 61 is the pipe 64 having the valve 65, this pipe being connected with one side of the T-coupling 66.

A second cylinder 67 is connected with the pipes 59 and 68 in exactly the same manner as the cylinder 61, the pipe 68 being connected with the opposite side of the T coupling 66 to that with which the pipe 64 is connected. The pipe 68 is also provided with a valve 69. Each of the cylinders 61 and 67 is loosely packed with cotton waste, or some other similar material, which acts to remove the dust from the gases passing from the combining chamber of the furnace. In some cases where the gases are under high pressure there is a tendency for the waste to become packed in one end of the cylinder, and in order to obviate this difficulty I sometimes employ a series of wooden frames fitting within the cylinders, these frames having cotton or other suitable quality of cloth stretched across them in much the same manner as the head of a drum is stretched into position. As the gases pass through the pipe 34 they may be caused to go through either the cylinder 61 or 67. If, for example, it is desired to pass the gases through cylinder 61, the valves 58 and 65 are opened and the valves 60 and 69 are closed. It is evident that if this is done the cylinder 67 may be removed for the purpose of cleaning or replacing the waste while the cylinder 61 is in operation. The object of providing two of the cylinders, through either one of which the gases may be caused to pass, is to make it possible to conduct a continuous operation of the filtering and straining device. I have found that this filtering device is effective not only in removing the dust from the outgoing gases but that it also serves in large measure to promote the further combination of the nitrogen and oxygen of the air, and that a greater percentage of oxids are formed when this plug filter is used than is the case when it is not employed.

From the coupling 66 the gases pass through the pipe 70 and enter the absorption tower F. This tower is preferably built of wood which has been previously soaked in paraffin, or some other similar compound which is not attacked by nitric acid. The absorption tower is filled with water in which are placed pieces of quartz 71 in order to more effectually break up the gases and promote absorption. The pipe 70 is provided inside of the tower with a wooden inclosing shell 72 so that the pipe may be readily withdrawn for repairs and again placed in position without disturbing the quartz 71. A sampling pipe 73 leads to the bottom of the absorption tower F, and through this pipe a small quantity of water and its absorbed gases may be withdrawn at any time through the valve 74 for testing purposes. The unabsorbed portion of gas passes through the pipe 75 to a second absorption tower F, and from this tower through a second pipe 76 to still another absorption tower. The number of these towers may be multiplied as desired in order to obtain a perfect absorption of the gas. Suitable piping may be provided so that the gas will enter into any desired absorption tower first and then pass to the others in any desired order. When the test shows that the water has absorbed the desired amount of nitric acid, the tower showing such test is cut off from the supply of gases and the nitric acid is drawn off. It is then refilled with water and the absorption process begins once more. The reaction occurring in the absorption of the nitric dioxid is as follows:

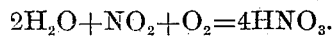

$$2H_2O + NO_2 + O_2 = 4HNO_3.$$

The electric current is supplied to the combining furnace E from two electric mains 77 and 78 which are connected to the two terminals of an alternating current generator. Having its primary winding connected to the mains 77 and 78 through the conductors 79 and 80 respectively is the transformer G. The conductor 81 serves to connect one terminal of the secondary winding of the transformer G with the pipe 13 of the upper electrode 12. The other terminal of the secondary winding is connected with the conductor 82. The winding of an inductance 83 is connected in series with the conductors 82 and 84. This inductance may be of any suitable type, its object being to cause steadiness and uniformity of action of the arc within the combining chamber. Any suitable constant current device may similarly be connected in series with the conductors 82 and 84.

Within the preheating chambers D are provided resistances 85, these resistances being connected in series by means of conductors 86. The conductor 87 connects the last resistance 85 with the rod 8, which is in electrical contact with the lower electrode of the furnace.

When it is desired to start the operation of my apparatus, the electrode 12 is lowered until it makes contact with the electrode 9, and is then gradually raised, the length of the arc thereby being increased. The air from compressor A passes through the driers and preheating chambers, as described above, and enters the combining chamber 1 of the furnace E through the pipes 42, 43 and 44 and the passages 45 and 46. The whirling motion given the air by the characteristic structure of the air inlets causes the action of the arc to be steady and uniform, and at the same time a greater volume of air is subjected to the action of the arc than would be the case if the air passed directly through a combining chamber. It is important, however, that the air should pass through the combining chamber at such a rate that the oxids of nitrogen which are formed by the electric arc should come within the water-cooled inner shell 30 sufficiently quickly so that the gases are not dissociated, while, on the other hand, the speed with which the air passes through the combining chamber must not be so excessive that the arc is blown out or disrupted thereby. It is clear in this connection that the size of the combining chamber 1 with respect to the air passing therethrough and the size of the arc are of vital importance. The chamber must be of sufficiently small diameter so that the whirling mass of ascending air will be thoroughly subjected to the action of the arc, and at the same time the chamber must be of sufficient height so that the combining action will be completed before the gases are suddenly cooled and thereby fixed. As a matter of practical experience I have found that a combining chamber having a height of about 30 inches from the lower part of the cooling shells 29 and 30 to the lower part of the combining chamber, a diameter of 7 inches, a distance between electrodes of not less than 3 inches, and an operating current of 100 amperes on a low tension circuit gives satisfactory results. Under ordinary operating conditions I have found that a distance between electrodes of 10 inches gives good results, the air inlet being located slightly above the lower part of the upper electrode. I do not mean in any way to confine myself to the dimensions or relation of parts just mentioned, as great variations may be made without affecting the operation of my system. I have mentioned these dimensions and proportions, however, to furnish an example of one of many possible methods of constructing my furnace. After the oxids of nitrogen have been fixed, it is evident that many different processes for forming nitric acid or nitrates may be used, several of such processes being well known in the art.

Many changes in the detailed construction of the apparatus which has been described could be made without departing from the spirit of my invention.

What I claim as new and desire to cover by Letters Patent is:

1. In apparatus for the treatment of gases, the combination of a combining chamber, means for directing the gases downwardly with a whirling motion around the inner surface of the wall of the chamber, and heating means in the chamber substantially in the center of the path of the whirling gases for effecting chemical combination of the gases as they subsequently ascend in the center of the chamber.

2. In apparatus for the treatment of gases, the combination of a combining chamber, means for directing the gases downwardly with a whirling motion around the inner surface of the wall of the chamber, heating means in the chamber substantially in the center of the path of the whirling gases for effecting chemical combination of the gases as they subsequently ascend in the center of the chamber, and means for cooling the combined gases on their passage from the chamber.

3. In apparatus for the treatment of gases, the combination of a combining chamber, a plurality of passages for directing the gases downwardly with a whirling motion around the inner surface of the wall of the chamber, and electrodes in the chamber substantially in the center of the path of the whirling gases for effecting chemical combination of the gases as they subsequently ascend in the center of the chamber.

4. In apparatus for the treatment of gases, the combination of a combining chamber, a plurality of passages for directing the gases downwardly with a whirling motion around the inner surface of the wall of the chamber, electrodes in the chamber substantially in the center of the path of the whirling gases for effecting chemical combination of the gases as they subsequently ascend in the center of the chamber, and means for cooling the combined gases on their passage from the chamber.

5. In apparatus for combining gases, the combination of a combining chamber, a passage leading tangentially and obliquely into said chamber, means for introducing the gases into said passage and thereby into said chamber, and means for heating the gases within said chamber to effect chemical combination between them.

6. In apparatus for combining gases, the combination of a combining chamber, a passage leading tangentially and obliquely into said chamber, means for introducing the gases into said passage and thereby into said chamber, means for heating the gases within said chamber to effect chemical combination between them, means for delivering said gases from said chamber, and means for cooling the gases on their outward passage.

7. In apparatus for the treatment of gases, the combination of a combining chamber, arc electrodes in said chamber, and means for introducing the gases into said chamber downwardly from above the lower electrode, the gases then naturally passing upward.

8. In apparatus for the treatment of gases, the combination of a combining chamber, a pair of arc electrodes in said chamber, and means for introducing the gases into said chamber downwardly from above the lower electrode and at the same time imparting a whirling motion thereto.

9. In apparatus for the treatment of gases, the combination of a combining chamber, arc electrodes in said chamber, and means for introducing the gases into said chamber from above said electrodes, said gases being directed downwardly and so as to assume a whirling motion.

In witness whereof, I hereunto subscribe my name this 12th day of August, A. D. 1909.

EDSON R. WOLCOTT.

Witnesses:
HENRY M. HUXLEY,
A. L. MENTZER.